United States Patent
Hirayama et al.

(10) Patent No.: US 7,136,723 B2
(45) Date of Patent: Nov. 14, 2006

(54) ROBOT CONTROLLER

(75) Inventors: Takahide Hirayama, Kitakyushu (JP);
Shinji Okumura, Kitakyushi (JP);
Hiyoyuki Handa, Kitakyushi (JP);
Takeshi Okamoto, Kitakyushu (JP)

(73) Assignee: Kabushiki Kaisha Yaskawa Denki, Kitakyushu ( * ) Notice: Subject to any disclaimer, the term of this patent is extended or adjusted under 35 U.S.C. 154(b) by 0 days.

(21) Appl. No.: 10/988,505

(22) Filed: Nov. 16, 2004

(65) Prior Publication Data
US 2005/0090934 A1 Apr. 28, 2005

Related U.S. Application Data

(63) Continuation of application No. 10/182,710, filed as application No. PCT/JP01/00903 on Feb. 8, 2001, now Pat. No. 6,853,878.

(30) Foreign Application Priority Data
Feb. 10, 2000 (JP) ............... 2000-34194

(51) Int. Cl.
*G06F 19/00* (2006.01)
(52) U.S. Cl. .............. 700/245; 700/247; 700/248; 700/250; 700/251; 700/252; 700/253; 700/254; 700/255; 700/257; 700/259; 700/260; 700/262; 700/264; 318/568.1; 318/568.11; 318/568.14; 318/568.16; 318/568.21; 318/568.23; 901/4; 901/43; 901/47
(58) Field of Classification Search ........... 700/245, 700/246, 247, 248, 250, 251, 252, 253, 254, 700/255, 257, 259, 260, 262, 264; 901/4, 901/43, 47; 318/568.1, 568.11, 568.13, 568.14, 318/568.16, 568.21, 568.23; 219/124.33, 219/124.34, 125.1
See application file for complete search history.

(56) References Cited

U.S. PATENT DOCUMENTS 4,538,233 A 8/1985 Resnick et al. ............. 700/252
4,969,108 A 11/1990 Webb et al. ................ 700/259

(Continued)

FOREIGN PATENT DOCUMENTS

JP 6-312276 11/1994

(Continued)

OTHER PUBLICATIONS

Agapakis et al., *Programming & control of multiple robotic devices in coordinated motion*, 1990, IEEE, pp. 362-367.

(Continued)

*Primary Examiner*—Thomas Black
*Assistant Examiner*—McDieunel Marc
(74) *Attorney, Agent, or Firm*—Westerman, Hattori, Daniels & Adrian, LLP.

(57) ABSTRACT

A robot controller for teaching a robot with high efficiency. The robot controller including command storage unit (21) where a movement command and a work command are stored, command identifying unit (24) for discriminating between the movement and work commands, unit (22) for making/editing a series of work programs or discrete work programs by a combination of the commands, work program storage units (23) where the work programs are stored so as to control the robot according to the stored program, further including a work section identifying unit (25) for identifying a work section of the work program by way of the command identification unit (24) and work section automatic stopping unit (27) for automatically stopping or suspending the execution of the work program at the work section in a standby state when the work section identifying unit (25) identifies the work section during the execution of the work program.

1 Claim, 16 Drawing Sheets

U.S. PATENT DOCUMENTS

| | | |
|---|---|---|
| 5,243,266 A | 9/1993 | Kasagami et al. ....... 318/568.1 |
| 5,798,627 A | 8/1998 | Gilliland et al. ....... 318/568.14 |
| 5,906,761 A | 5/1999 | Gilliland et al. ....... 219/124.34 |
| 6,023,044 A | 2/2000 | Kosaka et al. ......... 219/124.34 |
| 6,167,328 A | 12/2000 | Takaoka et al. ............ 700/264 |
| 6,249,718 B1 | 6/2001 | Gilliland et al. ............ 700/255 |
| 6,282,460 B1 | 8/2001 | Gilliland et al. ............ 700/255 |
| 6,356,806 B1 * | 3/2002 | Grob et al. ................. 700/245 |
| 2003/0040840 A1 | 2/2003 | Hirayama et al. .......... 700/245 |

FOREIGN PATENT DOCUMENTS

| | | |
|---|---|---|
| JP | 10-291183 | 11/1998 |
| JP | 11-309574 | 11/1999 |
| WO | WO97/11416 | 3/1997 |

OTHER PUBLICATIONS

Yamane et al., *Neural network and fuzzy control of weld pool with welding robot*, 1993, IEEE, pp. 2175-2180.

Ang Jr. et al. *A walk-through programmed robot for welding in shipyards*, 1999, Internet, pp. 1-22.

* cited by examiner

Fig. 4

| No. | Commands | |
|---|---|---|
| 001 | NOP | |
| 002 | MOVJ | ← Movement command |
| 003 | MOVL | ← Movement command |
| 004 | ARCON FILE(1) | ← Work command 01B |
| 005 | MOVL | ← Work section |
| 006 | ARCOF | ← Work command 01E |
| 007 | MOVL | ← Movement command |
| 008 | MOVJ | ← Movement command |
| 009 | MOVJ | ← Movement command |
| 010 | MOVL | ← Movement command |
| 011 | ARCON FILE(2) | ← Work command 02B |
| 012 | MOVL | ← Work section |
| 013 | ARCOF | ← Work command 02E |
| 014 | MOVL | ← Movement command |
| 015 | MOVJ | ← Movement command |
| 016 | MOVJ | ← Movement command |
| • | | |
| • | | |
| 165 | MOVJ | ← Movement command |
| 166 | MOVL | |
| 167 | ARCON FILE(50) | ← Work command 50B |
| 168 | MOVL | ← Work section |
| 169 | ARCOF | ← Work command 50E |
| 170 | MOVL | |
| 171 | MOVJ | ← Movement command |
| 172 | MOVJ | ← Movement command |
| 173 | END | |

→ : AIR-CUT SECTIONS
➡ : WORK SECTIONS

→ : AIR-CUT SECTIONS
➡ : WORK SECTIONS

Fig. 7

| No. | Commands | | |
|---|---|---|---|
| 001 | NOP | | |
| 002 | MOVJ | ← Movement command | |
| 003 | MOVL | ← Movement command | |
| 004 | ARCON FILE(1) | ← Work command 01B | |
| 005 | MOVL | ← Work section | |
| 006 | ARCOF | ← Work command 01E | |
| 007 | MOVL | ← Movement command | |
| 008 | MOVJ | ← Movement command | |
| 009 | MOVJ | ← Movement command | |
| 010 | MOVL | ← Movement command | |
| 011 | ARCON FILE(2) | ← Work command 02B | |
| 012 | MOVL | ← Work section | |
| 013 | ARCOF | ← Work command 02E | |
| 014 | MOVL | ← Movement command | |
| 015 | MOVJ | ← Movement command | (Selected) |
| · | | | |
| · | | | |
| · | | | |
| 165 | MOVJ | ← Movement command | |
| 166 | MOVL | | |
| 167 | ARCON FILE(50) | ← Work command 50B | |
| 168 | MOVL | ← Work section | |
| 169 | ARCOF | ← Work command 50E | |
| 170 | MOVL | | |
| 171 | MOVJ | ← Movement command | |
| 172 | MOVJ | ← Movement command | |
| 173 | END | | |

——— : AIR-CUT SECTIONS
━━━ : WORK SECTIONS
═══ : CORRECTING SECTION

——— : AIR-CUT SECTIONS
——— : WORK SECTIONS
═══ : CORRECTING SECTION
       (SELECTED SECTION)

Figs. 14
PRIOR ART (a) SCREEN OF A LIST OF WORK PROGRAMS

```
WORK A  WORK B  WORK C
WORK D  WORK E  WORK F
WORK G  WORK H  WORK I
```

(b) SCREEN OF DISPLAY OF WORK PROGRAMS

MOVE ↑↓   40 CURSOR
```
NOP
MOVL
MOVL
ARCON FILE(1)
MOVL
MOVL
ARCOF
```

(d) WORK PROGRAMS
```
NOP
MOVL
MOVL
ARCON FILE(1)
MOVL
MOVL
ARCOF
MOVL
MOVL
MOVL
·
·
ARCON FILE(5)
MOVL
MOVL
ARCOF
MOVL
END
```

(c1) SCREEN OF DISPLAY OF WORK FILE (1)
```
FILE (1)
WELDING CURRENT : 240A
WELDING VOLTAGE : 22V
WELDING SPEED : 60cm/min.
```

(c2) SCREEN OF DISPLAY OF WORK FILE (5)
```
FILE (5)
WELDING CURRENT : 250A
WELDING VOLTAGE : 22V
WELDING SPEED : 70cm/min.
```

Figs. 15

(a) SCREEN OF A LIST OF WORK PROGRAMS

WORK A  WORK B  WORK C
WORK D  WORK E  WORK F
WORK G  WORK H  WORK I (b) SCREEN OF DISPLAY OF WORK
    CONDITIONS AND WORK SECTIONS

| WORK A: NUMBER OF WELDING SECTIONS : 5 | | | | | |
|---|---|---|---|---|---|
| MAG GAS | | | | | |
| No. CURRENT | VOLTAGE | SPEED | PLATE THICKNESS | TYPE OF JOINT | TIME |
| 1   240A | 22V | 60cm/min | 6.0t | T-SHAPED JOINT | 10 s |
| 2   260A | 22V | 60cm/min | 6.0t | V-SHAPED LEG | 15 s |
| 3   240A | 21V | 50cm/min | 4.5t | OVERLAP JOINT | 13 s |
| 4   230A | 23V | 60cm/min | 6.0t | T-SHAPED JOINT | 16 s |
| 5   250A | 22V | 70cm/min | 3.2t | OVERLAP JOINT | 12 s |

WORK A:

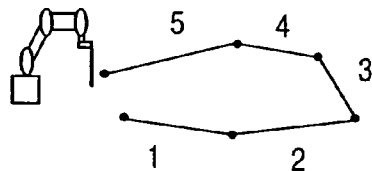

DISPLAY OF WORK RESULTS

| WORK A | | | |
|---|---|---|---|
| No. | CURRENT | VOLTAGE | JUDGEMENT OF WELDING RESULTS |
| 1 | 243A | 22V | |
| 2 | 262A | 22V | |
| 3 | 218A | 21V | NG BREAKAGE OCCURS. |
| 4 | 234A | 23V | |
| 5 | 250A | 22V | |

WORK A:

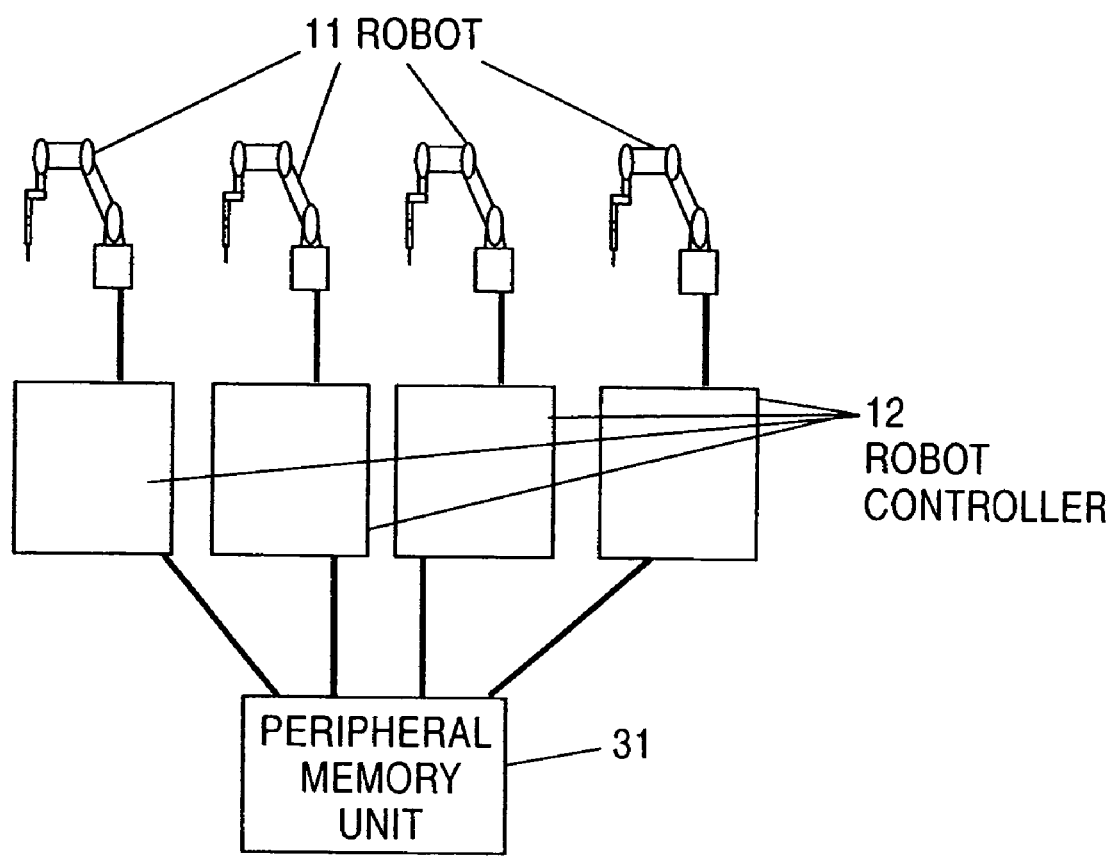

ROBOT CONTROLLER

This application is a continuation of U.S. patent application Ser. No. 10/182,710, filed on Aug. 8, 2002 now U.S. Pat. No. 6,853,878, which is a 371 of PCT/JP01/00903 filed Feb. 8, 2001.

TECHNICAL FILED

The present invention relates to a robot controller based on a teaching and playback system.

BACKGROUND ART

At present, various robots have been put into practice in various fields and are in operation. Almost all the robots are based on a teaching and playback system. In order to cause the robots to carry out movements and commands, it is necessary for a robot operator to prepare work programs by teaching work. Various types of movement commands and work commands are described in the work programs. By selecting and carrying out the work programs after the work programs are prepared, a robot executes a series of movements and works per teaching.

The teaching method of a robot, which is disclosed in Japanese Laid-Open Patent Publication No. Hei-8-19975 stores teaching data with identification numbers attached per work section, wherein editing of a sequence of a work section is enabled.

However, in order to modify the position/posture of a robot, movement conditions and work conditions thereof, it is necessary to change the work programs. However, where a series of work programs include several tens through several hundreds of work points, it is difficult to recognize sections where the robot actually operates, by only checking the movement section and work section in the programs written in terms of a robot language.

In this case, in the prior arts, an operator specifies an appointed section by pressing the operation key for respective teaching positions, one by one, many times regardless of whether it is an air-cut section or work section from the top of work programs, or manually guides the robot to an appointed section while paying sufficient attention so that the robot is not made to collide with fixtures, workpieces, and obstacles such as surrounding facilities. Therefore, a great amount of time and labor are required.

As has been disclosed in the above-described Japanese Laid-Open Patent Publication No. Hei-8-19975, in order to cause the robot to move from a certain teaching point to the next teaching point, it was necessary to cause the robot to reach a target work section by operating a key on the operation panel one by one by using a so-called step feeding means. As in the method described in the above-described Japanese Laid-Open Patent Publication No. Hei-8-19975, in the case of painting in which a plane is a work object, the total number of teaching points is comparatively small, and it is comparatively easy to cause the robot to reach the target work section through step feeding by the operation key. However, in the case of welding in which a complicated space is a work object, since there is a section for preventing an object work and a welding torch from being made to interfere with each other, an approaching section to a commencement position of a welding work section, and a section from the terminating section to the welding torch retreating section are indispensable, remarkably more movement sections other than work sections, than in the case of painting are provided, wherein it is necessary for an operator to repeatedly press the operation key many times in order to guide or lead the robot to an object work section by step feeding. With the method disclosed in Japanese Laid-Open Patent Publication No. Hei-8-19975, the problem cannot be solved. Also, since it is necessary to operate the key many times and attention must be paid to avoid obstacles, there arises a danger that may be brought about due to a lack of attention in the movements of the robot.

On the other hand, in a case where a plurality of work programs are prepared, there may be a case where which program corresponds to an appointed work becomes unclear. In such a case, the robot operator selected a work program, read the work program from the beginning to the end, and confirmed it.

As a method for facilitating confirmation of such a work program description, there is a method that is described in Japanese Laid-Open Patent Publication No. Hei-5-265534.

Hereinafter, taking welding work for instance, a brief description is given of the method with reference to FIG. 14. First, an appointed work program is selected from a list screen describing work programs as shown in FIG. 14($a$). When the work program is selected, the screen is changed to a work program display screen, which is shown in FIG. 14($b$). The work program display screen displays a part of the description of the work programs shown in FIG. 14($d$). An apparatus described in the above-described patent publication is featured in that, by moving the cursor 40 on the work program display screen, a description incidental to one command of the work program is picked up by using a convenience key. For example, in the program shown in FIG. 14($b$), when welding is commenced, a welding start command ARCON is given, and at the same time, the first welding conditions file (welding current, welding voltage, etc.,) (which is described as FILE (1)) is designated. At this time, by pressing a convenience key (not illustrated) after moving the cursor 40 to the welding start command ARCON, the screen is changed to a work file display screen as shown in FIG. 14($c1$). Similarly, in order to display the fifth welding conditions file shown in FIG. 14($c2$), it is necessary to press the convenience key after the cursor 40 is moved to the command position shown in FIG. 14($c2$). Thus, in Japanese Laid-Open Patent Publication No. Hei-5-265534, only information incidental to one command in the work program is picked up and is displayed.

However, in the prior art method for confirming descriptions of work programs, since the work programs are written in terms of movement commands and work commands, which are inherent to a robot controller, there is a problem in that an unskilled operator who is not acquainted with the meanings of the commands that constitute the work programs does not understand what kind of operation is to be carried out under which conditions and by which program.

Simultaneously, in order to understand a work description in the prior art robot controller, it was indispensable that a work program was selected and displayed, and an operator checked the work program from its beginning to its end, retrieved a work command, and confirmed the work conditions. Therefore, in a large work program consisting of several tens of commands, a great amount of time was required to check the contents of a work. Further, in order to check not only the work conditions but also the locus of a robot, there was no way other than actual operation of the robot.

Also, where results of the operation were obtained by executing a plurality of work programs, it was impossible to easily understand to which program the obtained results of the operation belonged or were related.

In addition thereto, where operation information of the work program was managed or controlled, it was necessary to pick up necessary information from the robot controller and for an operator to prepare and edit the work management information. For example, in order to prepare welding work information as shown in, for example, FIG. 15(b), the operator collected work files as shown in FIG. 14(c1) and other information, and prepared and edited the same.

DISCLOSURE OF THE INVENTION

Therefore, it is a primary object of the invention to provide a robot controller having features, which comprise high efficiency of robot teaching work, shortening of the time in correcting work programs, lightening of work load, and an increase in safety in operating the robot, by causing the robot to automatically pass through air-cut sections and work sections per teaching with one command without stopping and causing the same to automatically stop or suspend at an optionally selected section.

In addition, it is a secondary object of the invention to provide a robot controller having features, for which an unskilled operator who does not understand work commands of work programs can easily grasp the contents of work of the work programs, can instantaneously confirm the work contents without checking the entire work programs, and can easily understand to which work program the obtained work results belong or are related, and work management information is prepared at the robot controller side and is outputted therefrom without an operator preparing and editing the work management information so that the operator can instantaneously confirm the work management information.

In order to achieve the above-described primary object, a first means is featured in that a robot controller comprises command storage means for storing a movement command and a work command in advance, command identifying means for discriminating the above-described movement command from the above-described work command, means for preparing and editing a series of commands or discrete commands by a combination of the above-described commands, and work program storage means for storing the work programs that are prepared and edited in the above, wherein the robot controller is actuated by the above-described stored work programs; and The robot controller further comprises a work section identifying means for discriminating work sections of the above-described work programs by the above-described command identifying means, work section automatic stopping means for automatically stopping or suspending the execution of the above-described work programs in the above-described work section where a specified work section is identified by the above-described work section identifying means during the execution of the above-described work programs; wherein the above-described work section identifying means identifies that at least one work section existing between a work start command and a work termination command among the work commands discriminated by the above-described command identifying means is, respectively, an independent work section, or the above-described work section identifying means identifies that at least one work section existing between a work start command and a work termination command among the work commands discriminated by the above-described command identifying means is a work section, and the above-described work section automatic stopping means automatically stops or suspends at the start position and/or termination position of the work section discriminated by the above-described work section identifying means.

In order to achieve the above-described primary object, a second means is featured in that a robot controller comprises command storage means for storing a movement command and a work command in advance, command identifying means for discriminating the above-described movement command from the above-described work command, means for preparing and editing a series of commands or discrete commands by a combination of the above-described commands, and work program storage means for storing the work programs that are prepared and edited in the above, wherein the robot controller is actuated by the above-described stored work programs; and The robot controller further comprises section identifying means for identifying a movement section and a work section of the above-described work programs by the above-described command identifying means; section selecting means for selecting an optional section; and section automatic stopping means that consecutively moves in compliance with a movement command without executing any work command until reaching the section selected by the above-described section selecting means and automatically stopping or suspending a movement of the above-described work program in a section selected by the above-described section selecting means, wherein the robot is consecutively or intermittently moved after the same stops or suspends by the above-described section automatic stopping means.

The second means is featured in that the above-described identifying means identifies that at least one movement command section existing between a work start command and a work termination command among the work commands identified by the above-described command identifying means as one work section, the above-described section selecting means can set and store at least one optional section during the preparation and editing of a program; the above-described section automatic stopping means can automatically stop or suspend at the start position or termination position of a section selected by the above-described section selecting means, or the above-described section automatic stopping means can automatically stop or suspend at a work command point incidental to the start position or termination position of a section selected by the above-described section selecting means, or the above-described section automatic stopping means compares a section selected by the above-described section selecting means with the entire movement start sections of the work programs and the entire movement termination sections thereof, operates in the forward direction or backward direction from the movement start position close to the selected section or from the entire movement termination position, and automatically stops or suspends at the start position or termination position of the above-described selected section.

Also, a third means to achieve the above-described first object is featured in that a robot controller comprises command storage means for storing a movement command and a work command in advance, command identifying means for discriminating the above-described movement command from the above-described work command, means for preparing and editing a series of commands or discrete commands by a combination of the above-described commands, and work program storage means for storing the work programs that are prepared and edited in the above, wherein the robot controller is actuated by the above-described stored work programs; and further comprises section selecting means that can set and store information of at least one optional section during the execution of the above-described work programs.

Means to achieve the above-described second object is featured in that a robot controller, which is controlled by work programs in which a series of robot movement commands and welding work commands are described, comprises means for identifying welding work sections of the above-described work programs; means for sequentially storing welding work sections identified by the above-described work section identifying means; means for storing welding work conditions per work section which is stored by the above-described work section storing means; means for calculating work movement information per welding work section which is stored by the above-described work section storing means; means for storing work movement information calculated by the above-described movement information calculating means; and means for processing information, which is stored in the above-described work section storing means, the above-described work condition storing means, and the above-described work movement information storing means, to obtain work information for respective welding work sections; wherein said welding work conditions are a welding current command value, a welding voltage command value, welding speed, a plate thickness of a workpiece to be welded, a profile of a joint, and a type of sealing gas, the above-described work movement information is work time, work section length, and type of movement interpolation, the above-described work information includes a movement locus of a robot, an actually measured value of the welding voltage, an actually measured value of the welding current, and the results of a welding work, and further comprises means for displaying, in a unit of the above-described work program, the above-described welding work conditions or the above-described work information together with the above-described movement locus which is graphically displayed.

The robot controller further includes a peripheral work state monitoring unit and means for storing results of work, which are obtained by the robot controller.

The above-described work information can be devised to be outputted into a peripheral memory unit and at least one of robot locus, work conditions, work movement information and results of work may be used as the above-described work information.

The above-described work conditions may be at least a welding current command value, a welding voltage command value, and a welding speed, and may be plate thickness, joint and shield gas.

Also, the above-described work movement information may be work time in respective work sections, work section length, and type of movement interpolation.

The work results may be at least one of the measured welding current value, measured welding voltage value, and defective welding identification results.

BRIEF DESCRIPTION OF THE DRAWINGS

FIG. 4 is a view showing an example of a work program;
FIG. 7 is a view showing an example of a work program;
FIGS. 14 (a), (b), (c1), (c2) and (d) are views expressing work contents of a work program according to a prior art;
FIGS. 15(a) and (b) are views expressing a method for confirming work contents of a work program according to the invention;
FIG. 17 is a view expressing an example of application of the invention to a welding line.

BEST MODE FOR CARRYING OUT THE INVENTION

Figure 1:
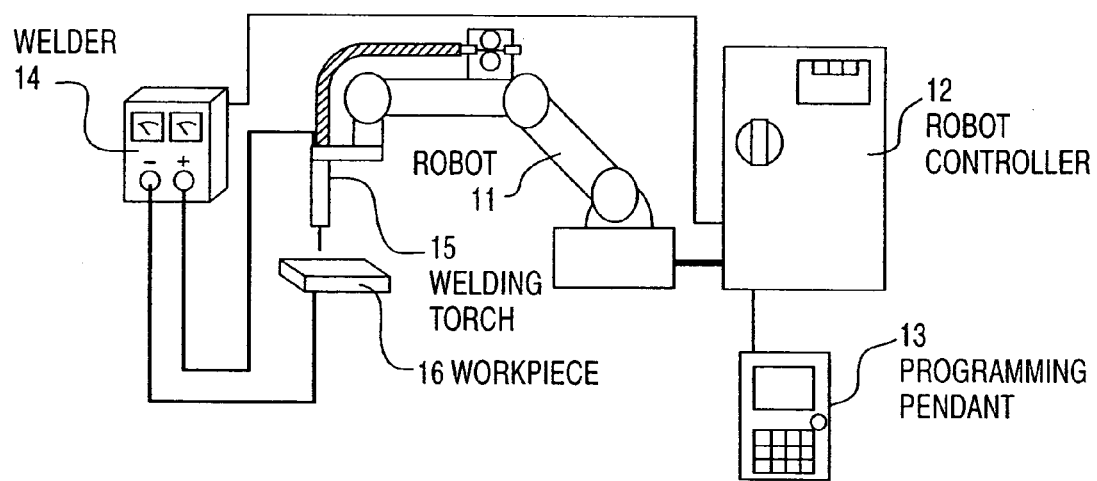
FIG. 1 is a configurational view of a welding robot system according to the invention.

Hereinafter, a description is given of embodiments of the present invention based on the modes shown in the drawings, where an arc welding work is carried out for instance.

[Embodiment 1]

FIG. 1 is a configurational view of a welding robot system according to the invention. A robot 11 operates by commands from a robot controller 12.

A programming pendant 13 is a human interface for displaying, preparing and editing states of a robot and work programs. When teaching the robot work, an operator prepares and edits work programs while operating the robot 11 and robot controller 12 by operating the programming pendant 13.

Figure 2:
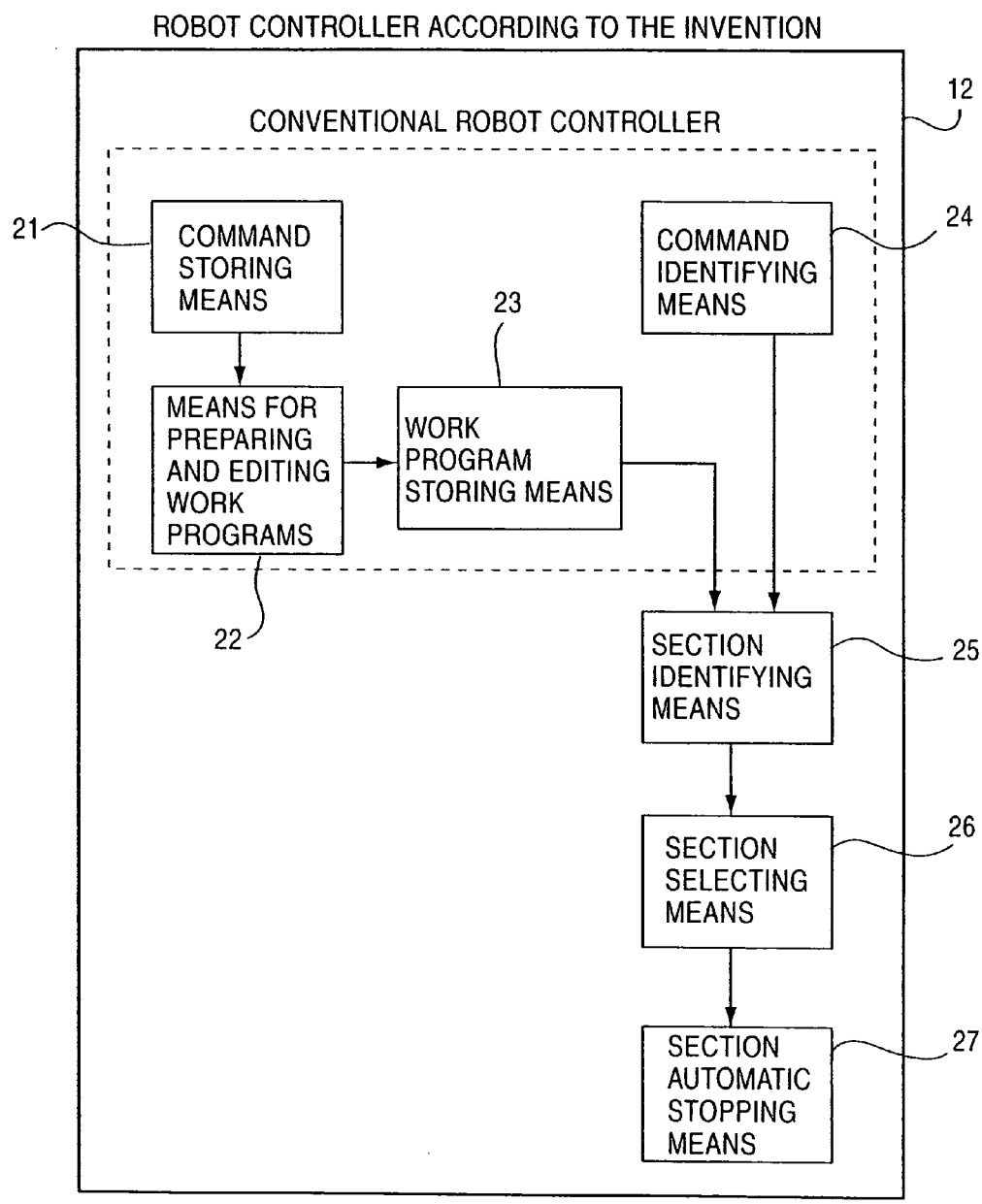
FIG. 2 is a block diagram showing a construction of the invention.

When a work program is completed and the robot 11 is caused to carry out work, the robot controller 12 actuates the robot 11 as a work program, and at the same time, outputs a command to a welder 14. The welder 14 issues outputs (current and voltage) suited to a command to a welding torch 15 and a workpiece 16 to be welded, and welding is carried out. FIG. 2 is a block diagram showing a construction of the invention. The robot controller according to the invention is comprised of command storing means 21, means 22 for preparing and editing work programs, work program storing means 23, command identifying means 24, section identifying means 25, section selecting means 26, and section automatic stopping means 27.

In the Embodiment 1, no section selecting means 26 is used.

Figure 3:
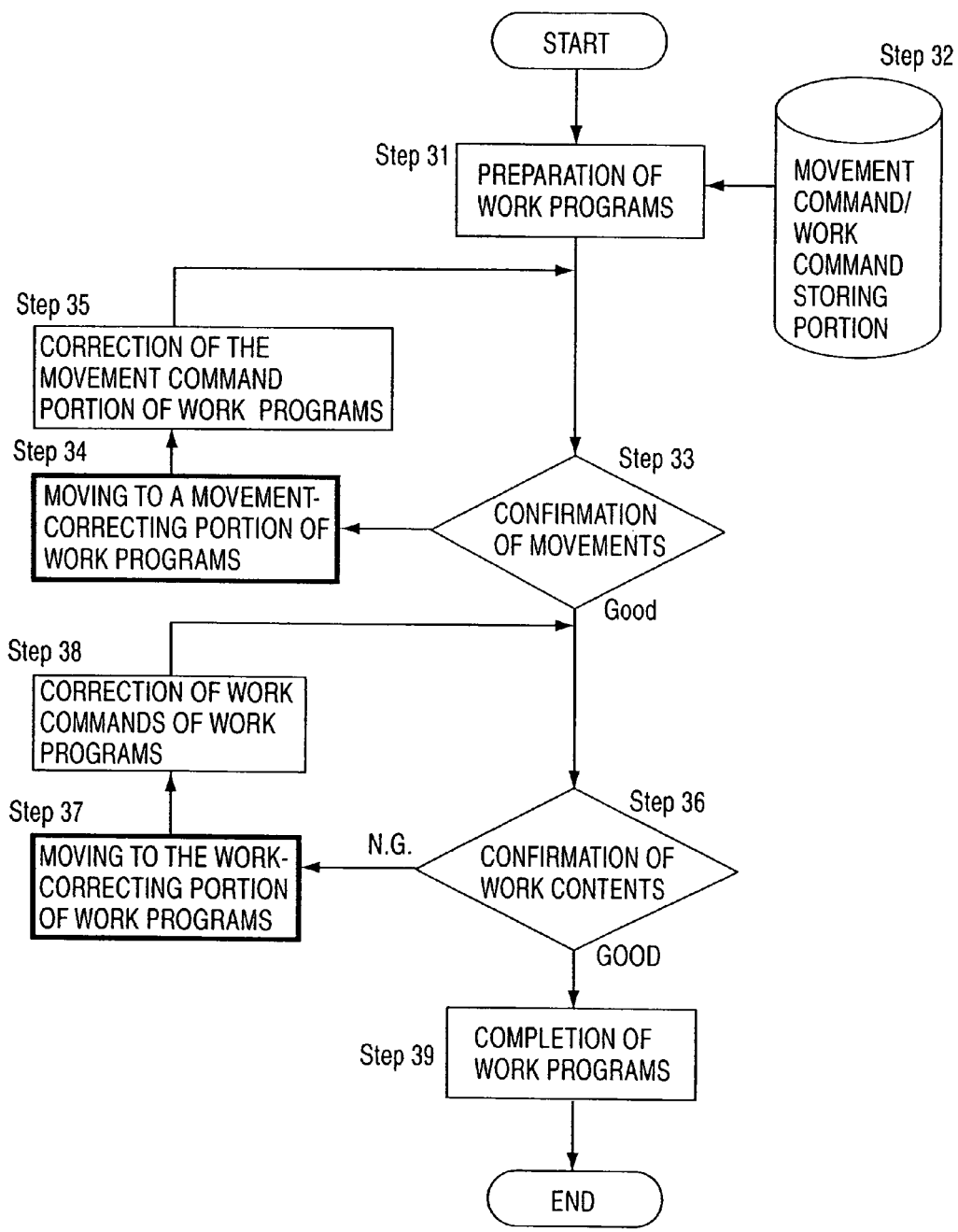
FIG. 3 is a flowchart for preparing and editing work programs.

FIG. 3 is a flowchart to prepare and edit work programs of a robot. Hereinafter, a description is given of the flowchart step by step.

Step 31: An operator prepares work programs by combining movement commands and work commands, which are stored in Step 32, while operating the robot controller 12 and robot 11 by using the programming pendant 13.

Step 33: It is checked whether or not the robot 11 executes an appointed movement on the basis of the work program prepared in Step 31. Where the robot can execute the appointed movement, the process advances to Step 36, wherein it is checked whether or not the robot 11 and welding torch 15 are made to collide with or are interfered with by a workpiece 16 to be welded and other peripheral members. Where the robot does not execute the appointed movement, the process advances to Step 34.

Step 34: The robot is moved to a position where the appointed movement checked in Step 33 cannot be obtained.

Step 35: A movement command is corrected at the position where the robot is moved in Step 34, while the operator is observing the movement of the robot so that no collision and interference occur.

Step 36: After confirming in Step 33 that the robot executes an appointed movement, it is checked herein whether or not the robot operates under appointed conditions. In the example, since arc-welding work is taken as an example, it is checked herein whether or not the robot carries out welding at appointed welding quality. Where the appointed work is carried out, the process advances to Step 39, and where the appointed work is not executed, the process advances to Step 37.

Step 37: The robot is moved to a position where the appointed work content checked in Step 36 has not been obtained.

Step 38: The work command is corrected so that the appointed work content (herein, welding quality) can be obtained at the position where the robot has been moved in Step 34.

Step 39: The work program is completed by repeating a series of the above-described checks and corrections.

As described above, a brief description has been given of preparation of a work program of a robot. Next, a method for moving the robot to the correction positions in Step 34 and Step 37 is described in detail by comparing a view showing a work program example in FIG. 4 with the prior art method of movement in FIG. 5 and the method for movement according to the invention in FIG. 6.

Figure 5:
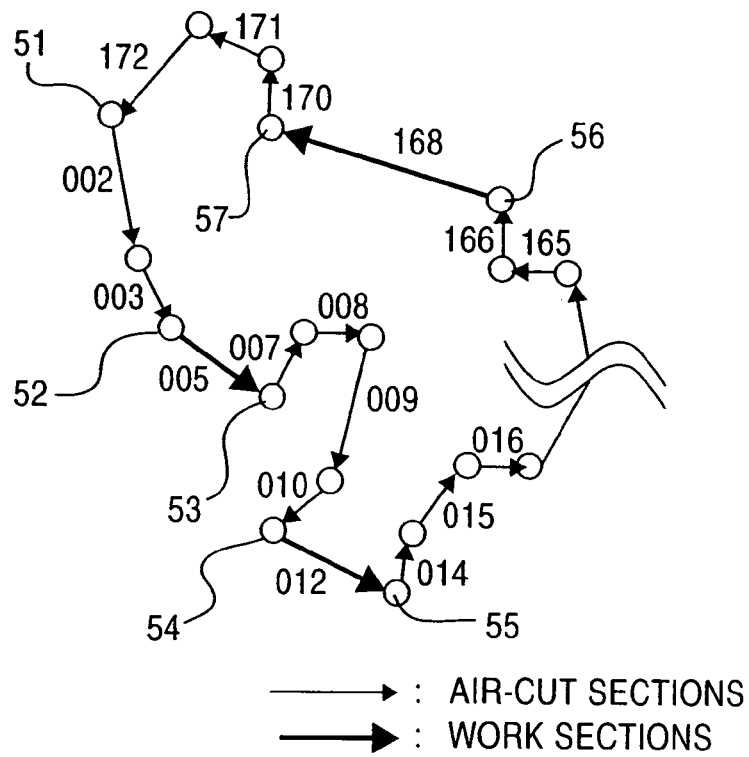
FIG. 5 is a view showing a conventional method of movement.
Figure 6:
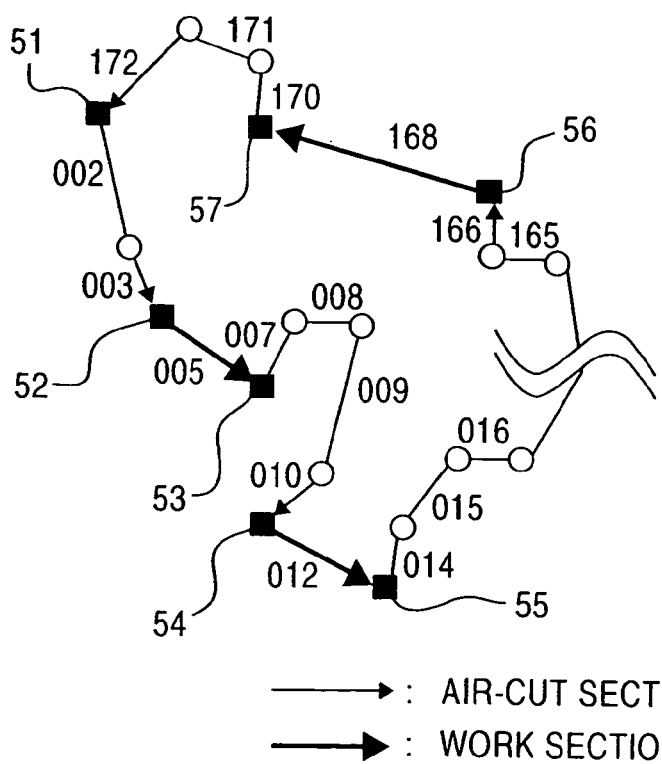
FIG. 6 is a view showing a method of movement according to the invention.

FIG. 4 shows that the work program example is composed of a movement command and a work command. Circle marks shown in FIG. 5 and FIG. 6 show the tip end positions of the welding torch 15, and black square marks therein show the tip end positions of the welding torch 15, and the work start and termination positions, and respective thin lines therein show air-cut sections, respective thick lines show work sections (welding sections) where work is carried out while moving, and arrows show movement sections in which the robot moves when pressing the operation key of the teaching pendant 13 once. Further, figures attached to the respective lines in FIG. 5 and FIG. 6 indicate command numbers attached to the left end in FIG. 4. Reference number 51 denotes an initial movement and a terminal position. Reference number 52 denotes a point at which a work start command 001B in FIG. 4 is executed. Reference number 53 denotes a point at which a work termination command 001E in FIG. 4 is executed. Reference number 54 denotes a point at which a work start command 002B in FIG. 4 is executed. Reference number 55 denotes a point at which a work termination command S002E in FIG. 4 is executed. Reference number 56 denotes a point at which a work start command C:50B in FIG. 4 is executed. Reference number 57 denotes a point at which a work termination command 050E in FIG. 4 is executed.

In the prior art method of movement, for example, where interference with a workpiece occurs in the air-cut section 016 in FIG. 5, in order to move the tip end of a welding torch attached to a robot to the section, it is necessary to repeatedly press an operation key for respective commands and to guide the robot from the initial movement position 51 to the air-cut section 016. In this example, it is necessary to press the operation key 15 times. Also, in the prior art method where a welding defect occurs in the work section 012, it is necessary to repeatedly press the operation key for respective commands and to guide the robot from the initial movement position 51 to the work section 012. In this example, it is necessary to press the operation key 11 times.

To the contrary, in the movement method according to the invention, MOVL of command numbers 005, 012 and 168 existing between ARCON 1 FILE (#) (#: Figure), which is a work start command in FIG. 4, and ARCOF, which is a work termination command, is identified as a work command, and the movement can be stopped at the identified point of a work command. In detail, where interference with a workpiece occurs in the air-cut section 016 in FIG. 6, in order to move the tip end of a welding torch attached to the robot to the section, when the operation key is pressed once at the initial movement position 51, the robot automatically passes the air-cut section since the work section can be identified, it is possible to stop the robot at the position 52 that is the work section start position. By repeating this, the robot advances to the work section termination position 55, and moves to the air-cut section 015 by the operation method which is similar to the conventional method. In this case, it is possible for the robot to reach a target air-cut section by pressing the operation key six times. Also, even where a welding defect occurs in the work section 012 in FIG. 6, it becomes possible to guide the robot from the initial movement position 51 to the work section 012 by only pressing the operation key several times for respective black square marks. In this case, it is possible for the robot to reach a target work section by pressing the operation key only three times.

[Embodiment 2]

Figure 8:
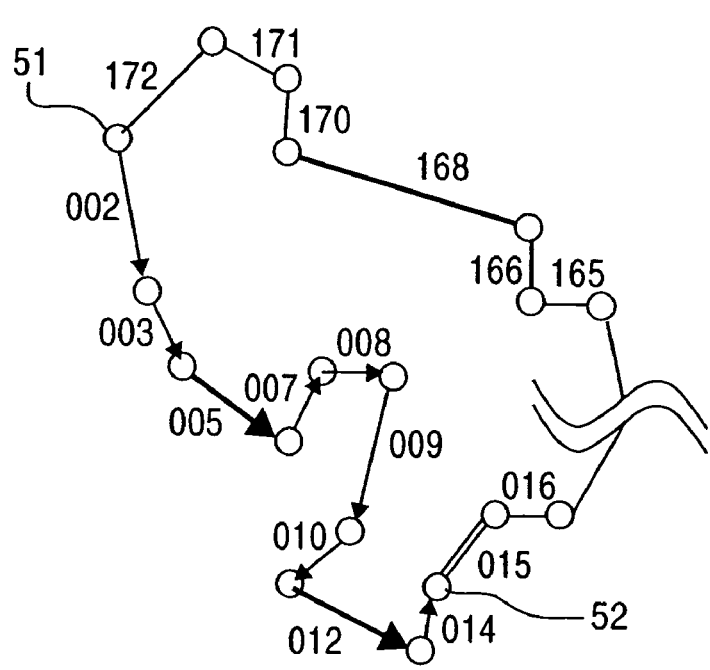
FIG. 8 is a view showing a conventional method of movement.
Figure 9:
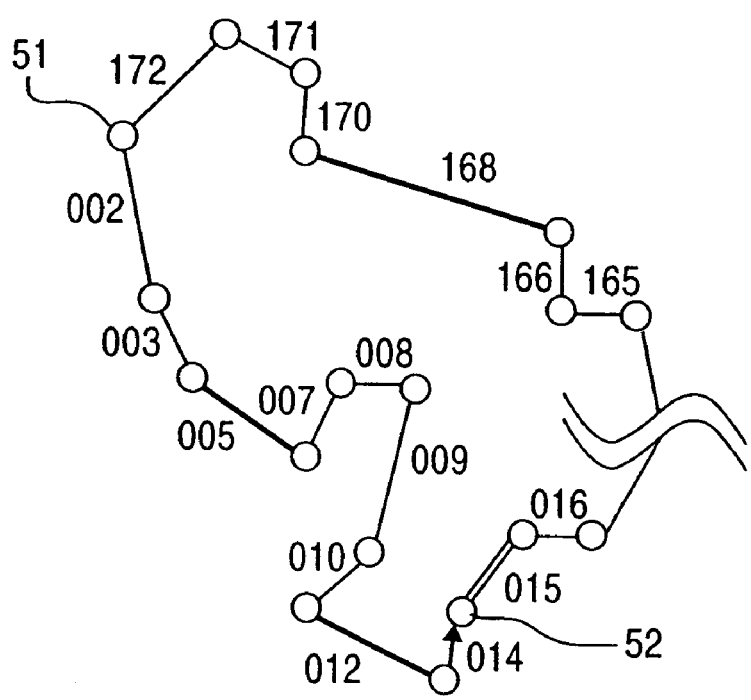
FIG. 9 is a view showing a method of movement according to the invention.

Next, a detailed description is given of the second embodiment regarding a movement method to correction positions of Step 34 and Step 37 in FIG. 3 with reference to a view showing a work program example in FIG. 7 while comparing a prior art movement method in FIG. 8 with a movement method according to the invention in FIG. 9. FIG. 7 showing a work program example is composed of a movement command and a work command.

Circle marks shown in FIG. 8 and FIG. 9 indicate the tip end positions of a welding torch 15, respective fine lines therein indicate air-cut sections, respective thick lines therein indicate work sections (welding sections) in which work is carried out while moving, a double line therein indicates a section to be corrected, and an arrow indicates a movement section in which a robot moves by pressing the operation key of the teaching pendant 13 once.

In addition, figures attached to respective lines in FIG. 8 and FIG. 9 indicate command numbers attached to the left side in FIG. 7, reference number 51 indicates the initial movement position and termination position, and reference number 52 indicates a starting point of a correction section.

In the prior art movement method, where interference with a workpiece occurs at the air-cut section 015 in FIG. 8, in order to move the tip end of a welding torch attached to the robot to the section, it is necessary to guide the robot from the initial movement position 51 to the air-cut section 015 by repeatedly pressing the operation key for respective commands. In this example, it is necessary to press the operation key 13 times (including a work command). In addition, where a welding defect occurs in the work section 012 during the execution of a program, a work section in the program is specified by repeatedly and continuously pressing the operation key for respective commands in the prior art movement method and guiding the robot from the initial movement position 51 to the work section 012. In this example, it is necessary to press the operation key nine times.

To the contrary, with a movement method according to the invention, it is possible to identify respective sections in FIG. 7 and to stop the movement of a robot at a selected section (point where white and black inverted letters exist).

In detail, where interference with a workpiece at the air-cut section 015 occurs in FIG. 9, in order to move the tip end of a welding torch attached to a robot to the section, as the operation key (section selecting means 26 in FIG. 2) is pressed once at the initial movement position 51, the robot automatically passes through the air-cut sections and work sections other than the selected section, and the robot can automatically stop at the position 52, which is a movement section start position. Further, where a welding defect occurs in the work section 012 during the execution of a program, if the section in which the welding defect occurred is selected, and operation which is similar to the above can be carried out when correcting the program, it becomes possible to automatically move the tip end of the welding torch to and stop the same in the selected section, that is the section in which the welding defect occurred.

[Embodiment 3]

Hereinafter, a description is given of a mode of the invention while taking a welding work as an example, with reference to the drawings.

Figure 10:
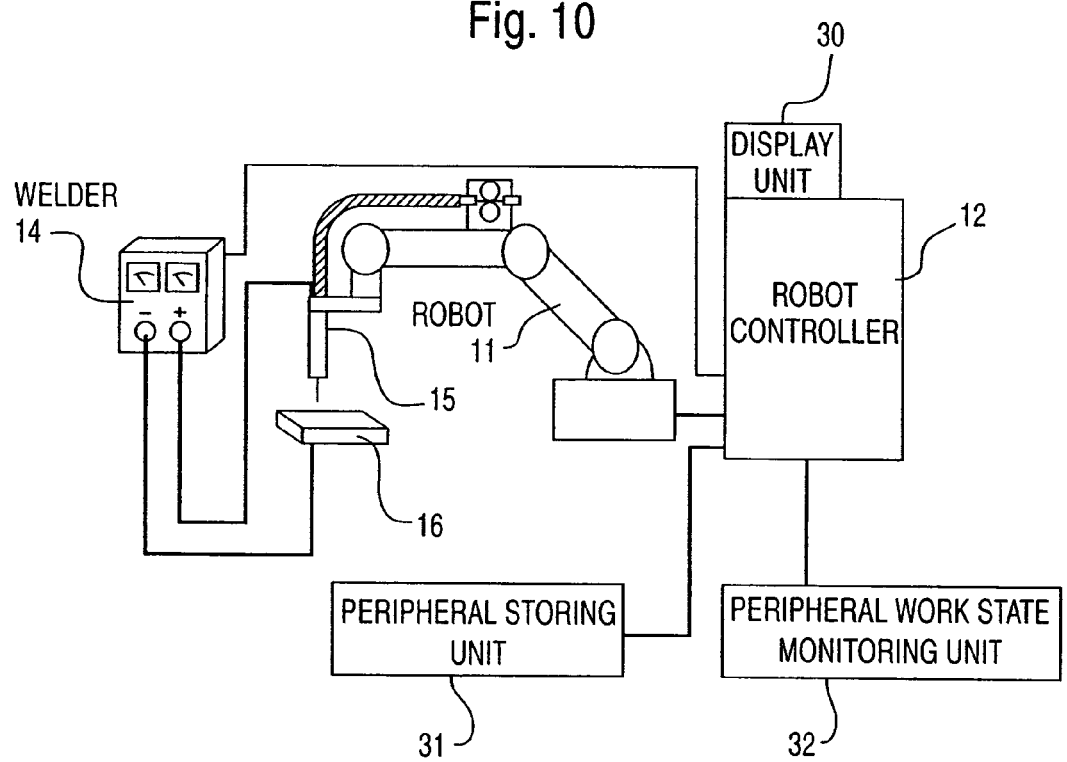
FIG. 10 is a configurational view of a welding robot system according to the invention.

FIG. 10 is a configurational view of a welding robot system according to the invention. The robot 11 moves by commands from the robot controller 12. In a welding work section, a command signal is transmitted from the robot controller 12 to a welder 14, and welding is carried out under appointed conditions. Also, work information such as various types of work conditions regarding work programs, work movement information and robot loci is displayed on a display unit 30, wherein it is possible to instantaneously check the work contents of respective work programs. The work information is outputted to a peripheral memory unit 31 such as a personal computer via a communications interface, wherein it is possible to check the work management information. A peripheral work state monitoring unit 32 is a unit that detects a current and a voltage during welding, as in, for example, an arc monitoring unit, and monitors welding conditions including a welding defect. The results thereof are outputted to the robot controller 12.

Figure 11:
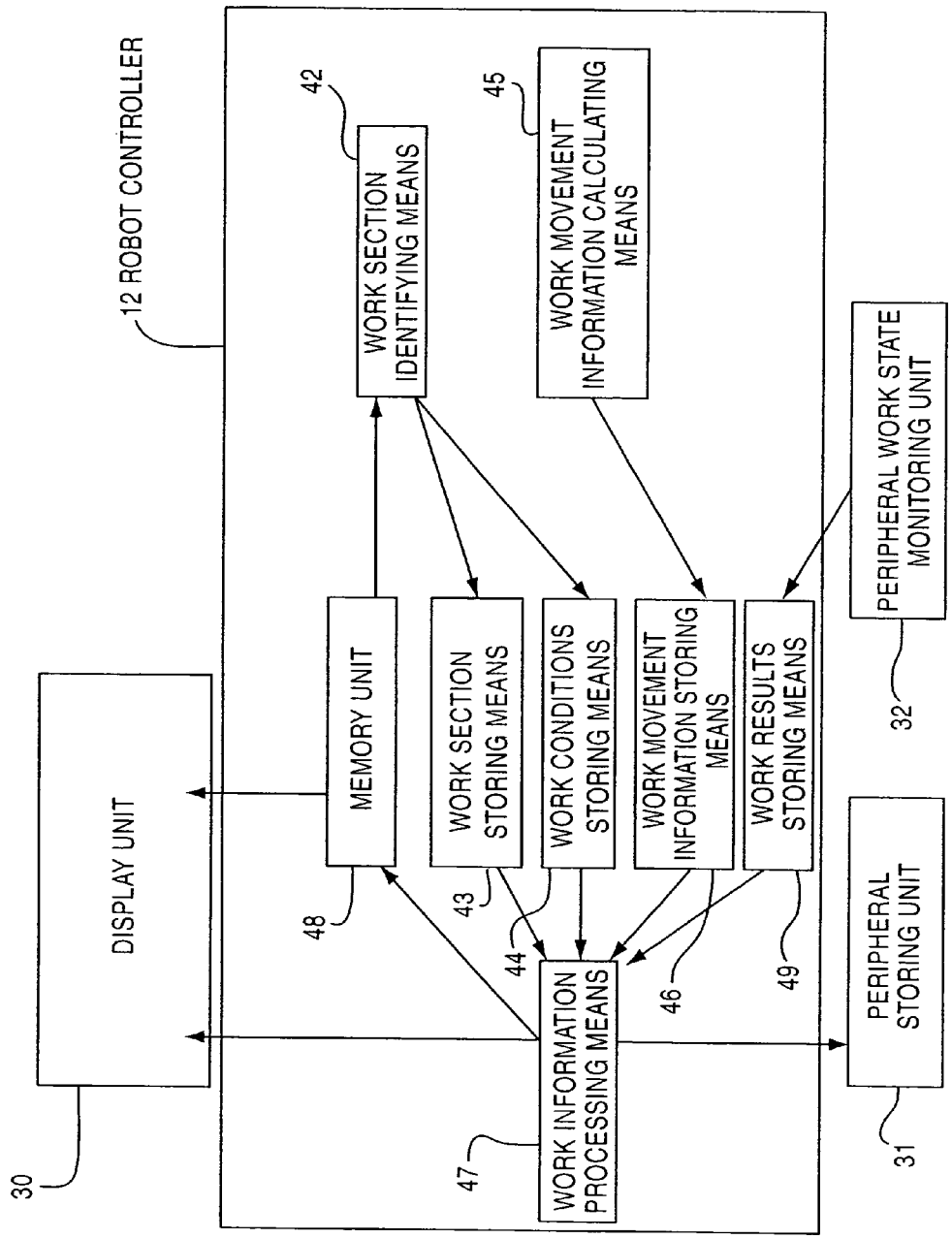
FIG. 11 is a detailed view describing the inside of a robot controller according to the invention.

FIG. 11 is a detailed view describing the interior of the robot controller. In the invention, as shown in FIG. 11, the robot controller 12 is provided with work section identifying means 42, work section storing means 43, work condition storing means 44, work movement information calculating means 45, work movement information storing means 46, and work information processing means 47. A memory unit 48 stores work programs, robot movements, various types of files regarding works, parameters, etc.

Figure 12:
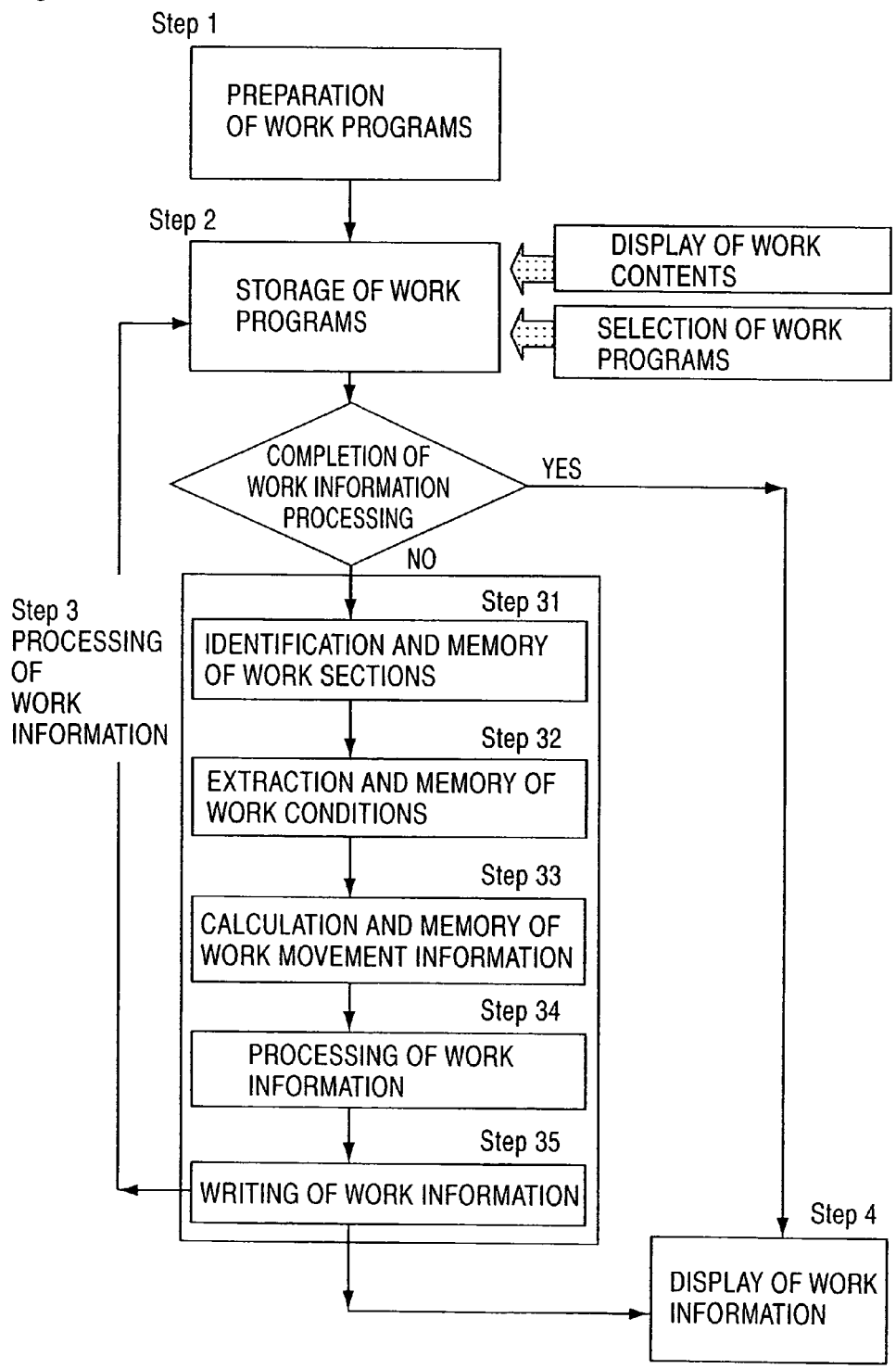
FIG. 12 is a flowchart of the invention.

FIG. 12 shows a flowchart of the functions of the invention. A sequence is introduced below. First, as shown in Step 1 in FIG. 12, a work program is prepared. In Step 2, the prepared work program is stored in the memory unit 48. Where the work content is confirmed, a plurality of work programs are stored in the memory unit 48 as shown in FIG. 15(a), a specified work program is selected on a list screen showing the work programs as a list. At this time, a work content display request is issued.

Where no work information is processed, work information processing in Step 3 is commenced. The work information processing in Step 3 is classified into processes shown in Step 31 through Step 35.

First, in Step 31, work sections are identified, and the number of work sections is counted. A work program is picked up from the memory unit 48 in FIG. 11, what line in the work program is the work section is calculated by the work section identifying means 42, and the number of work sections included in the work program is counted. The work section information identified by the work section identifying means 42 is stored in the work section storing means 43.

Next, in Step 32, work conditions in the respective work sections in the work program are extracted and stored. Welding conditions in the respective work sections are picked up by the work section identifying means 42 and stored in the work condition storing means 4.

Figure 13:
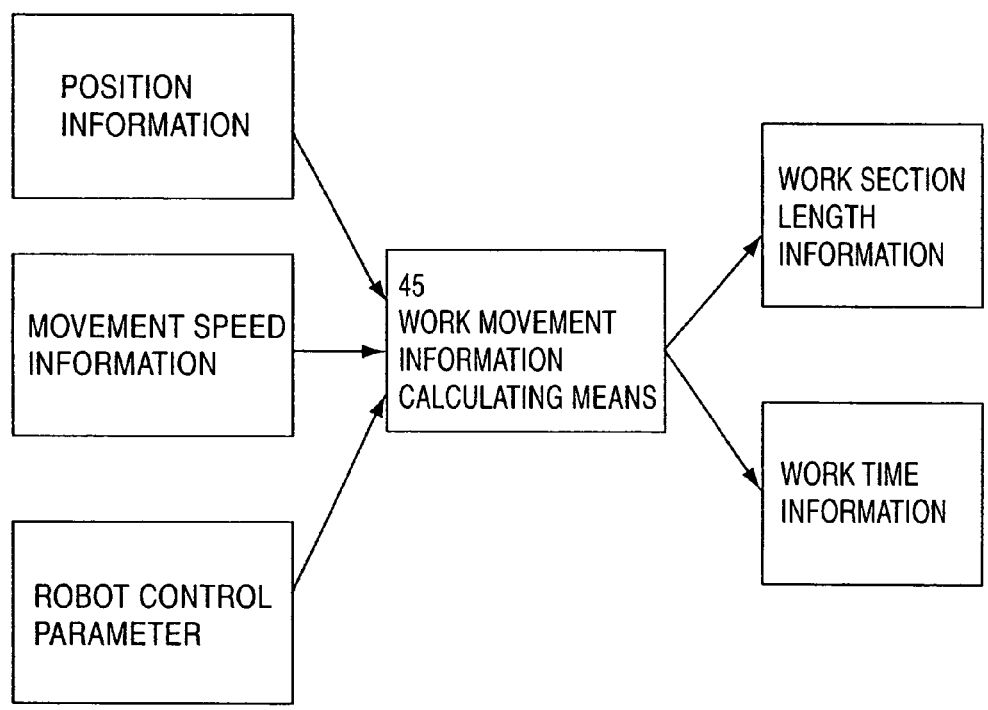
FIG. 13 is a conceptual view expressing a method for calculating work movement information.

In Step 33, the work movement information is calculated and is stored. As shown in FIG. 13, position information of a work section picked up by the work section identifying means 42 and robot control parameters that regulate movement speed information of a robot, acceleration and deceleration speeds, etc., of the robot are provided to the work movement information calculating means 45, and the work time information and work section length information, etc., are calculated, and are stored in the work movement information storing means 46.

In Step 34, the work conditions, work section information and work movement information, which are thus picked up, are processed to work information by the work information processing means 47.

In Step 35, the work information thus obtained is written in the memory unit 48.

Simultaneously, in Step 4, the work information is displayed via the display unit 30. With the processed work information, for example, the robot loci (welding speed and welding time) in the work section are displayed together with the work conditions (that is, welding current value and welding voltage value) as shown in FIG. 15(b), and the profile (that is, plate thickness, joint profile) of the work to be worked can be easily confirmed for the respective work sections.

Once the work information is processed and stored in the memory unit 48, the process immediately shifts to Step 4 without the processing of the work information in Step 3 when selecting a work program, wherein the work information can be displayed in the display unit 30.

As described above, with the invention, it is possible to instantaneously provide only necessary information as shown in FIG. 15(b) so that an unskilled operator can easily understand the work programs.

Also, the second embodiment of the invention is provided with means 49 for storing the results of work, which are obtained by a peripheral work state monitoring unit 32 (a unit for detecting the current and voltage during welding and monitoring a welding state including a welding defect as in, for example, an arc-monitoring unit), and the robot controller 12. In the work information processing in Step 3, the work information is processed together with the results of work. The processed work information can be confirmed by the display unit 30 as in the prior art.

Figure 16:
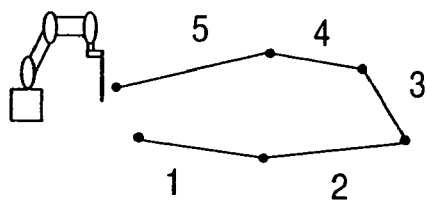
FIG. 16 is a view expressing a display screen of work results of a work program according to the invention.

Welding work is shown in FIG. 16 as an example of the processed work information. Information of judgement of the welding results is displayed in addition to the welding current value and welding voltage value, which are the welding results for the respective sections. In the work section 3, it can be confirmed that a welding breakage has occurred. Thus, the processed information can be used as welding quality management information regardless in which state the welding has been carried out (the actual welding current value and welding voltage value) and whether or not any welding defect has occurred.

In the third embodiment of the invention, the above-described work information is outputted to not only the robot controller but also the peripheral memory unit 31. Therefore, it is possible to collectively control information of a plurality of robot controllers that constitute a welding line shown in FIG. 17.

As described above, the following effects can be brought about according to the invention.

1. Since the robot controller is provided with work section identifying means that identifies work sections of work programs by command identifying means, and work section automatic stopping means that automatically stops or suspends the execution of work programs in a work section where it is identified by the work section identifying means during the execution of the work programs that the work section is an actual work section, it is possible to immediately move the robot to an appointed movement section and work section by a minimum number of operations, wherein the robot teaching work can be made very efficient, and time and labor, which are required to correct the work programs, can be greatly reduced.
2. Since the number of times of operation is few and the robot can be automatically stopped in a specified work section, an operator can pay sufficient attention to movements of the robot, wherein safety of operating the robot can be increased.
3. Since the robot controller is provided with means for displaying work information of the respective work sections stored in respective work programs, an unskilled operator who is not acquainted with work commands of the work programs can easily understand the work contents of the work programs. Also, it is possible to instantaneously check the work contents and movement loci of the robot without observing the entirety of the work programs.
4. Since the robot controller is provided with means for storing the work results for the respective work programs, it is possible to easily understand to which work program the obtained work results relate, and the work results can be utilized as work quality management information.
5. Since the processed work information can be outputted to a peripheral memory unit, it is possible to collectively manage information of a production using a plurality of robots.

INDUSTRIAL APPLICABILITY

The present invention is effective as a robot controller of a teaching and playback system.

What is claimed is:

1. A robot controller comprising: command storage means for storing a movement command and a work command in advance; command identifying means for discriminating said movement command from said work command; means for preparing and editing a series of commands or discrete commands by a combination of said commands; and work program storage means for storing the work programs that are prepared and edited in the above, wherein the robot controller is actuated by said stored work programs; and further comprising: work section identifying means for discriminating work sections of said work programs by said command identifying means; and work section automatic stopping means for automatically stopping or suspending the execution of said work programs in said work section where a specified work section is identified by said work section identifying means during the execution of said work programs.

* * * * *